United States Patent [19]

Furukawa et al.

[11] Patent Number: 4,566,710

[45] Date of Patent: Jan. 28, 1986

[54] STEERING SYSTEM FOR VEHICLES

[75] Inventors: Yoshimi Furukawa, Saitama; Shoichi Sano, Tokyo, both of Japan

[73] Assignee: Honda Giken Kogyo Kabushiki Kaisha, Tokyo, Japan

[21] Appl. No.: 659,322

[22] Filed: Oct. 10, 1984

[30] Foreign Application Priority Data

Oct. 17, 1983 [JP] Japan ................................ 58-193661

[51] Int. Cl.⁴ ............................................ B62D 7/00
[52] U.S. Cl. ...................................... 280/91; 180/140
[58] Field of Search ............................ 280/91, 96, 707; 180/140, 141, 142, 143; 74/571 L, 831, 834, 836

[56] References Cited

U.S. PATENT DOCUMENTS 4,105,086  8/1978  Ishii et al. ............................... 280/91
4,313,514  2/1982  Furukawa et al. ..................... 280/91

FOREIGN PATENT DOCUMENTS 26363  2/1984  Japan .

Primary Examiner—Joseph F. Peters, Jr.
Assistant Examiner—Ross Weaver
Attorney, Agent, or Firm—Irving M. Weiner; Joseph P. Carrier; John J. Cantarella

[57] ABSTRACT

A steering system for vehicles in which the steered angle ratio of a rear wheel (20) to a front wheel (7) is controllable by a control device (31) in accordance with the vehicle speed.

The steering system has a straight travelling condition detecting device (34; 37) operatively connected to the control device, so that a correction of the steered angle ratio in accordance with the vehicle speed is effected only when a straight travelling condition of the vehicle is maintained for a predetermined period of time.

6 Claims, 10 Drawing Figures

STEERING SYSTEM FOR VEHICLES

BACKGROUND OF THE INVENTION

1. Field of the Invention

The present invention relates to a steering system for vehicles of the type in which a rear wheel is steerable in relation to the steering operation of a front wheel, and more particularly, to a steering system for vehicles in which the steered angle ratio of a rear wheel to a front wheel is variable in accordance with the vehicle speed.

2. Description of Relevant Art

There has already been proposed a steering system for vehicles in which the steered angle ratio of a rear wheel to a front wheel is variable in accordance with the vehicle speed, and more particularly, in which the rear wheel is steered, at relatively low vehicle speeds, in the opposite direction to the front wheel or substantially at an angle of zero degree and, at relatively high vehicle speeds, in the same direction as the front wheel, as shown in FIG. 8 of the accompanying drawings. (Japanese Laid Open Application No. JP-A-59-26363 dated Feb. 10, 1984)

In such a steering system, as the vehicle speed is decreased with a steering wheel held at a constant steering angle when the vehicle is turning at a high speed in a steering mode in which a rear wheel is steered in the same direction as a front wheel, the steered angle of the rear wheel correspondingly decreases, resulting in a varying difference between the steered angles of the front and rear wheels, whereby the turning radius of the vehicle becomes smaller.

Incidentally, most ordinary vehicles with an unsteerable rear wheel are set so as to have what is called an understeer characteristic which, as the vehicle speed is increased with a steering wheel held at a constant steering angle to raise the stability in high-speed travelling, enlarges the turning radius. Also in such an ordinary vehicle with an understeer characteristic, the turning radius becomes smaller as the vehicle speed is decreased while the vehicle is turning.

However, in those vehicles equipped with a steering system in which the steered angle ratio of a rear wheel to a front wheel is variable in accordance with the vehicle speed, such an understeer characteristic appears more effective than in the ordinary vehicle in which the rear wheel is unsteerable. As a result, when increasing and decreasing the vehicle speed while turning, the driver has to make a corresponding correction of the handling operation of a steering wheel by a larger degree than in the ordinary vehicle. Particularly in the case where such acceleration or deceleration is effected suddenly, the degree of correction becomes large.

With such point in mind, the present invention has been achieved to provide an improvement in a steering system for vehicles of the above-mentioned type.

SUMMARY OF THE INVENTION

According to the present invention, there is provided a steering system for vehicles including a steering wheel, a front wheel, a front steering means for steering the front wheel, a rear wheel, a rear steering means for steering the rear wheel, a ratio changing means for changing the steered angle ratio of the rear wheel to the front wheel, a control means for controlling the ratio changing means, a ratio detecting means for detecting the steered angle ratio, the ratio detecting means cooperating with the control means, a speed detecting means for detecting the vehicle speed, and the speed detecting means cooperating with the control means, in which the rear wheel is steered at relatively low vehicle speeds in the opposite direction to the front wheel or substantially at an angle of zero degree and at relatively high vehicle speeds in the same direction as the front wheel. A means for detecting a straight travelling condition of the vehicle is operatively connected to the control means, so that a correction of the steered angle ratio in accordance with the vehicle speed is effected only when the straight travelling condition of the vehicle is maintained for a predetermined period of time.

Accordingly, an object of the present invention is to provide a steering system for vehicles, in which, even when the vehicle speed is varied while the vehicle is turning, the driver is permitted to be free from unnecessary correcting operations of a steering wheel.

The above and further features, objects and advantages of the present invention will become apparent from the following detailed description of the preferred embodiment of the invention when the same is read in conjunction with the accompanying drawings.

DETAILED DESCRIPTION OF PREFERRED EMBODIMENTS

Figure 1:
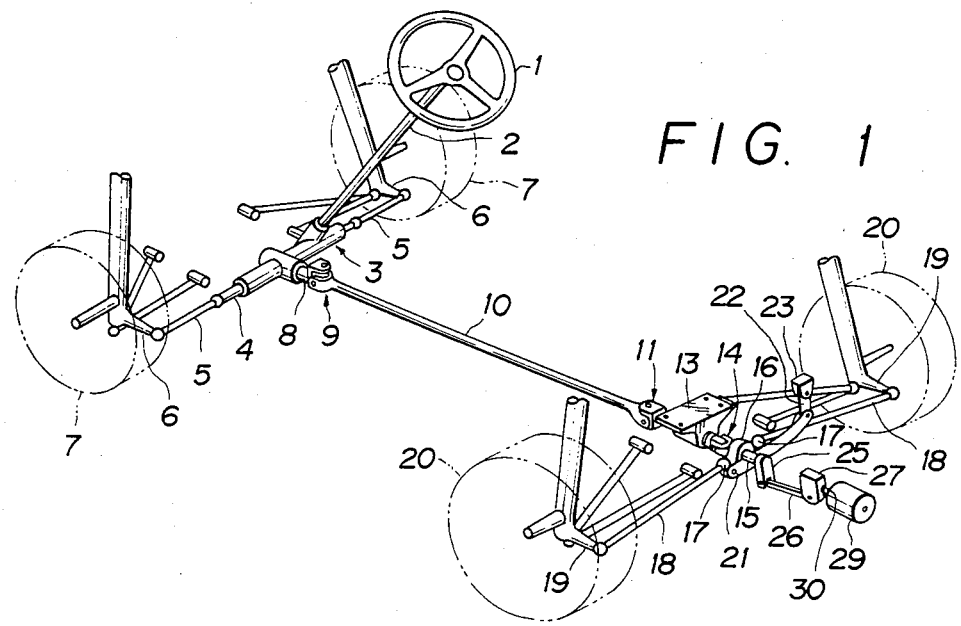
FIG. 1 is a schematic perspective view showing a basic structure of a vehicle equipped with a steering system according to the preferred embodiment of the invention.
Figure 2:
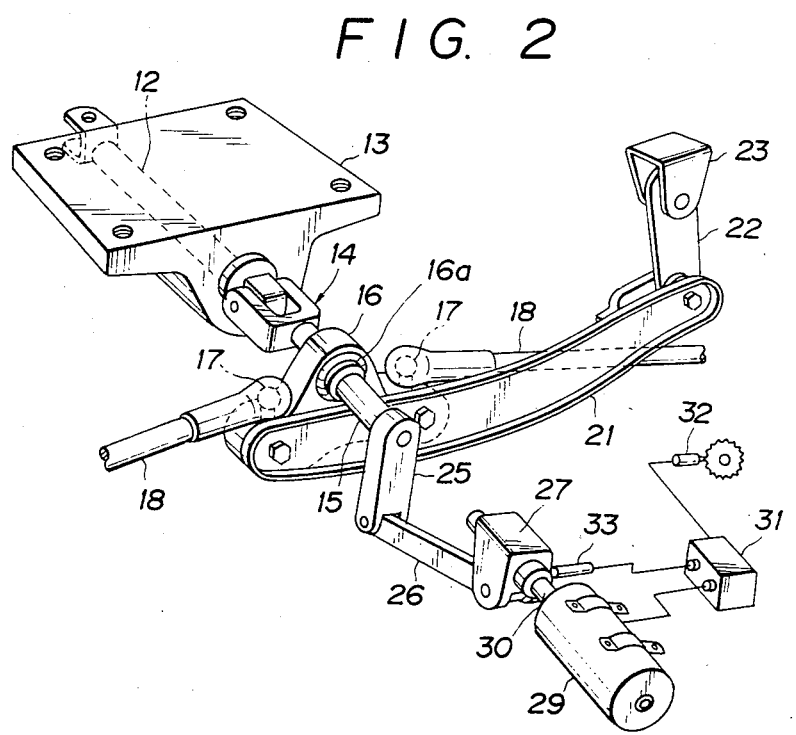
FIG. 2 is an enlarged perspective view of a rear wheel steering mechanism of the steering system of FIG. 1.

There will be described hereinbelow a steering system for vehicles according to the preferred embodiment of the invention, which includes a basic steering system substantially equivalent to that of the known steering system described hereinabove. FIGS. 1 and 2 show the arrangement of the basic steering system, the function of which will be described in detail hereinbelow in conjunction with FIGS. 3a to 3c.

Referring first to FIG. 1, designated at reference numeral 1 is a steering wheel. The steering wheel 1 is fastened to the upper end of a steering shaft 2 assembled at the lower end thereof in a gearbox 3 of a rack and pinion type, which has a rack shaft 4 connected at each transverse end thereof through one of a pair of tie rods 5, 5 to one of a pair of knuckle arms 6, 6 each respectively supporting one of a pair of front wheels 7, 7, to be steered in the same steering direction as the steering wheel 1, whereby a known front-wheel steering mechanism is constituted.

The gearbox 3 further has a pinion shaft 8 rearwardly projected therefrom, the shaft 8 being connected at the rear end thereof through a universal joint 9 to the front end of a relatively long linkage shaft 10, which in turn is connected at the rear end thereof to a later-described input shaft of a rear-wheel steering mechanism, the input shaft extending along the longitudinal centerline of a vehicle body (not shown) and being rotatably supported by means of a bearing bracket 13 secured to the vehicle body. The rear end of the input shaft is connected through a bifurcated joint 14 to a swingable shaft 15 having at the longitudinally middle part thereof a joint member 16 loosely fitted thereon. The joint member 16 is connected at each transverse end thereof through one of a pair of ball joints 17, 17 to the inner end of one of a pair of tie rods 18, 18, while being transversely and vertically swingably suspended from the vehicle body by means of a pair of link plates 21, 22 supported by a bracket 23. The tie rods 18, 18 are each respectively connected at the outer end thereof to one of a pair of knuckle arms 19, 19 which support a pair of rear wheels 20, 20, respectively.

Referring now to FIG. 2, the swingable shaft 15 has, at the longitudinally intermediate part thereof, a rotary part 16a of the joint member 16 fixedly fitted thereon and, at the rear end thereof, an arm member 25 secured thereto at the upper end thereof so as to be kept perpendicular to the swingable shaft 15. The lower end of the arm member 25 is pivotably connected the front end of a link 26, which in turn is pivotably connected at the rear end thereof to a slider 27 screw-feedably fitted, by means of a ball and screw mechanism 28 shown in FIGS. 3a to 3c, on an output shaft 30 of a control motor 29. The motor 29 is fixed to the vehicle body so that the output shaft 30 extends in alignment with the abovementioned input shaft, which is designated at reference numeral 12 in FIG. 2.

Moreover, the vehicle has mounted thereon a microcomputer 31 adapted to receive data signals from both a vehicle speed sensor 32 for detecting the travelling speed of the vehicle and a slider position sensor 33 for detecting the screw-fed position of the slider 27, to thereby supply a proper control signal to the motor 29 in accordance with the vehicle speed.

In the above arrangement, a mechanism for changing the steered angle ratio of the rear wheels 20, 20 to the front wheels 7, 7 is constituted by the swingable shaft 15, the joint member 16, the arm member 25, the link 26, the slider 27, the motor 29, and the output shaft 30.

Figure 3A:
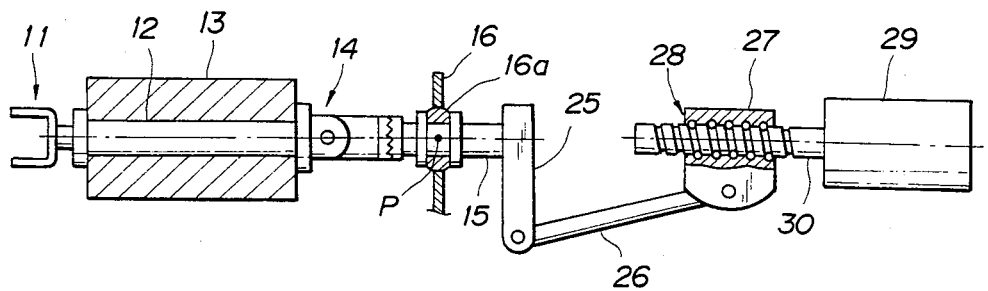
FIGS. 3a to 3c are longitudinal sectional side views, for functional explanation, of an essential part of the rear wheel steering mechanism of FIG. 2.
Figure 3B:
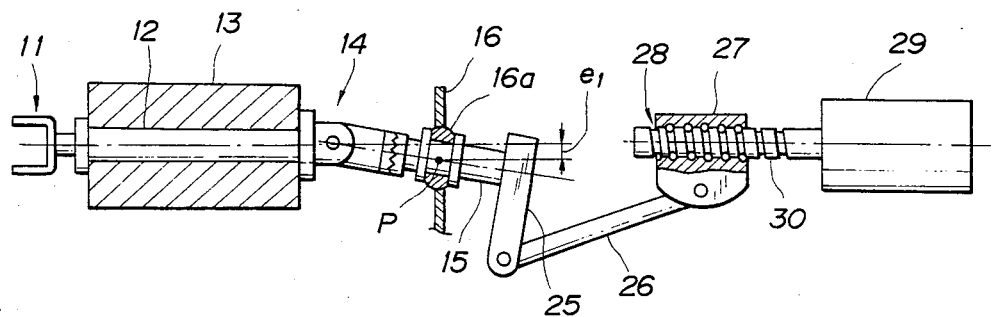
Figure 3C:
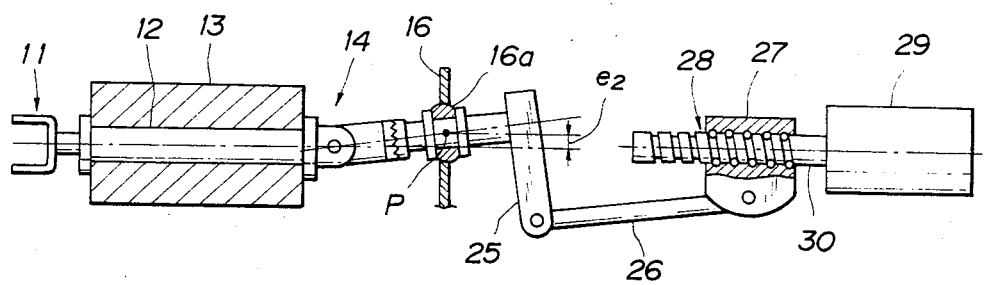

Referring now to FIGS. 3a to 3c, the steered angle ratio changing mechanism will be described below with respect to the function thereof.

Figure 8:
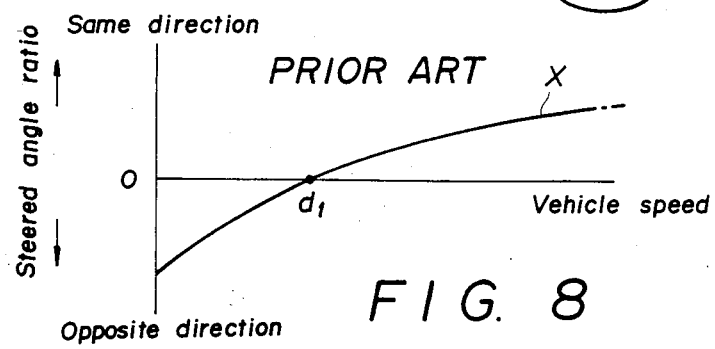
FIG. 8 is a graph showing a steered angle ratio characteristic between a front wheel and a rear wheel of a conventional steering system.

When the vehicle speed is equal to a predetermined reference speed $d_1$ shown in FIG. 8, then the slider 27 is located at a position shown in FIG. 3a and hence the joint member 16 has a pivot point P thereof on the extension of the axis of the input shaft 12. In such case, the swingable shaft 15 is permitted to coaxially rotate with the input shaft 12, so that even when the swingable shaft 15 is rotated the joint member 16 will not laterally swing, thus being kept from actuating the left and right rear tie rods 18, 18. Accordingly, when operated, the steering wheel 1 will steer only the front wheels 7, 7, leaving the rear wheels 20, 20 unsteered.

On the other hand, while the vehicle speed is lower than the reference speed $d_1$, the computer 31 receiving a corresponding signal from the vehicle speed sensor 32 makes a judgement, which causes the motor 29 to be controlled with respect to the number of revolutions thereof in response to the detected vehicle speed, whereby the slider 27 is advanced as shown in FIG. 3b from the position thereof in FIG. 3a. At such a low speed, the resultant advance of the slider 27 makes the swingable shaft 15 incline downwardly, thereby downwardly offsetting the pivot point P by a distance $e_1$ from the axis level of the input shaft 12. Accordingly, when operated, the steering wheel 1 causes the rotary part 16a of the joint member 16 to be laterally swung under a horizontal plane including the axis of the input shaft 12, thereby bringing the rear tie rods 18, 18 in the opposite direction to the front tie rods 5, 5, so that the rear wheels 20, 20 are steered oppositely to the front wheels 7, 7, while the steered angle ratio between the front and rear wheels 7, 7 and 20, 20 is substantially proportional to the offset distance $e_1$ which continuously varies depending on the vehicle speed.

To the contrary, while the vehicle speed is higher than the reference speed $d_1$, the computer 31 causes the motor 29 to be reversed in accordance with the vehicle speed, so that the slider 27 is retreated as shown in FIG. 3c from the position thereof in FIG. 3a. At such a high speed, the resultant retreat of the slider 27 makes the swingable shaft 15 incline upwardly, thereby upwardly offsetting the pivot point P by a distance $e_2$ from the axis level of the input shaft 12. Accordingly, when operated, the steering wheel 1 causes the rotary part 16a of the joint member 16 to be laterally swung under the horizontal plane including the axis of the input shaft 12, thereby bringing the rear tie rods 18, 18 in the same direction as the front tie rods 5, 5, so that the rear wheels 20, 20 are steered in the same direction as the front wheels 7, 7, while the steered angle ratio therebetween is substantially proportional to the offset distance $e_2$ which also continuously varies depending on the vehicle speed.

The computer 31 comprises a microcomputer system including, but not limited to, a plurality of integrated circuits (not shown) such as a CPU, a ROM, a RAM, and a plurality of peripheral interfaces.

According to such a basic steering system as abovedescribed, at relatively low vehicle speeds a rear wheel is steered in the opposite direction to a front wheel, thus giving relatively small turning radii, improving the vehicle turning characteristic, and at relatively high vehicle speeds it is steered in the same direction as the front wheel, thus improving the steering responsiveness.

In the steering system according to the preferred embodiment of the invention, a transverse acceleration sensor 34 for detecting the transverse acceleration of the vehicle is provided in the vicinity of the center of gravity of the vehicle and electrically connected to the computer 31, so that only in a state where the transverse acceleration is substantially zero, which state can be considered as a substantially straight travelling condition of the vehicle, is the control motor 29 driven by the computer 31 to thereby correct the steered angle ratio in accordance with the vehicle speed.

Figure 4:
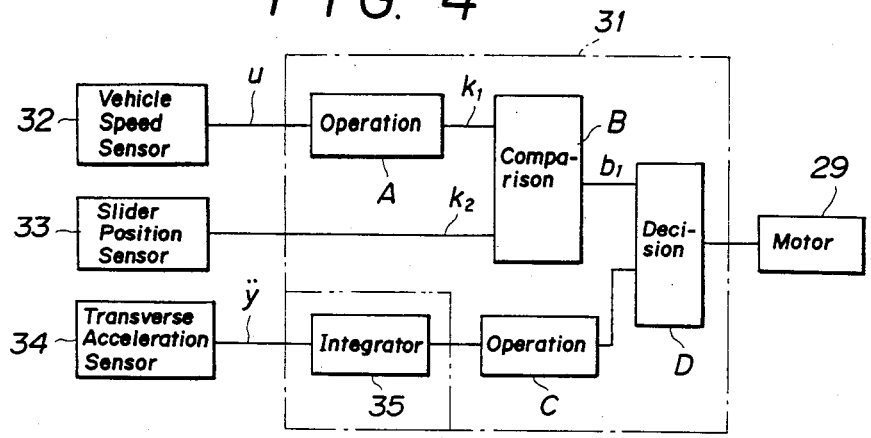
FIG. 4 is a functional block diagram of a control part of the steering system of FIGS. 1, 2, and 3a to 3c.

Referring now to FIG. 4, in the computer 31, there is given a signal carrying data on the vehicle speed as a speed data signal u from the vehicle speed sensor 32. The speed data signal u is processed by an operation function A to calculate a necessary steered angle ratio $k_1$, which in turn is compared through a comparison function B with a real-time steered angle ratio $k_2$ detected through the slider position sensor 33, to determine the degree of necessary correction of the steered angle ratio, which degree of necessary correction is output in the form of a correction signal $b_1$.

On the other hand, from the transverse acceleration sensor 34, there is given a signal representing an actual transverse acceleration as a transverse acceleration detection signal y. The transverse acceleration detection signal y is deprived of high-frequency components thereof at an integral circuit 35 to obtain a transverse acceleration signal $y_1$ consisting of low-frequency components. Then, by means of an operation function C, the transverse acceleration signal $y_1$ is compared with a reference level TL as a threshold level corresponding to a substantially straight travelling condition of the vehicle, to check whether the level of the transverse acceleration signal $y_1$ is lower than the reference level TL. The result of this check is interrogated to be used as data for a decision function D, by which a judgment is made as to whether or not the level of the transverse acceleration signal $y_1$ is kept out of excess of the reference level TL for a predetermined period of time. When the signal level is kept unexcessive longer than this period, the before-mentioned correction signal $b_1$ is output as a correction drive command to the control motor 29 to thereby properly move the slider 27. As a result, the steered angle ratio is to be corrected in accordance with the vehicle speed.

In the case where the level of the transverse acceleration signal $y_1$ has exceeded the reference level TL, the correction signal $b_1$ is kept from being output to the control motor 29.

The foregoing processes in the computer 31 are exercised by following a control program stored in the ROM as a memory of the micro-computer system.

Figure 5:
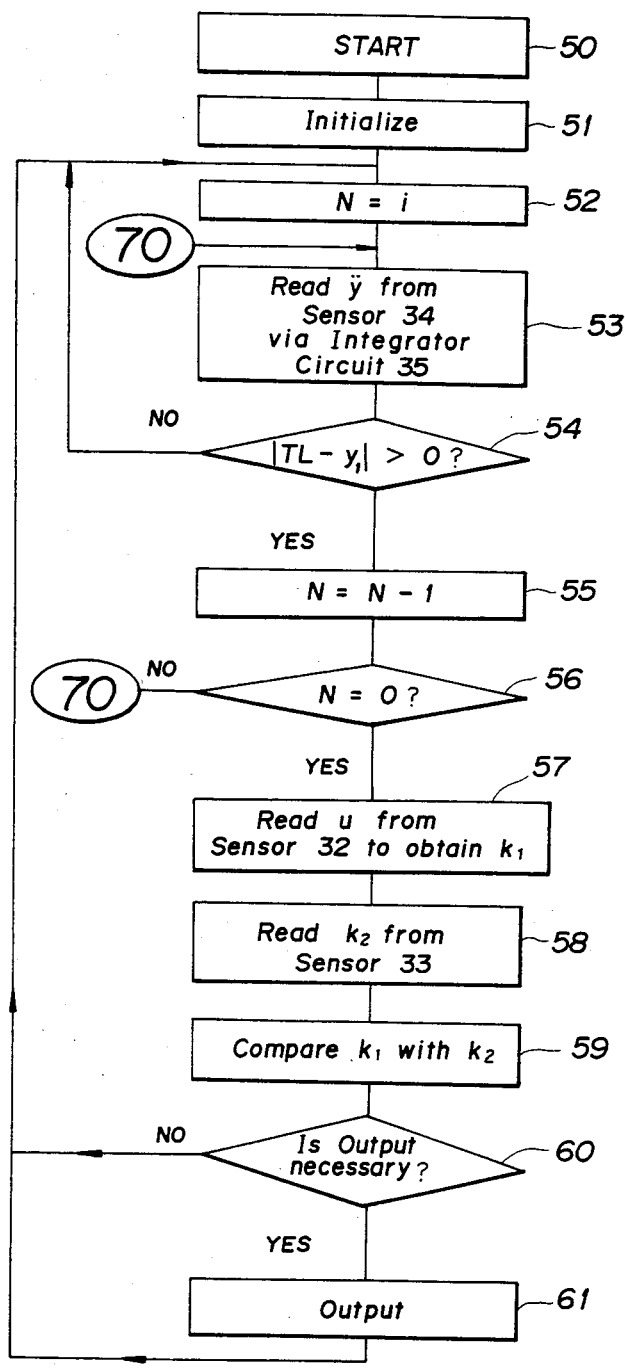
FIG. 5 is a schematic flowchart of a program for a micro-computer system of the control part of FIG. 4.

FIG. 5 is a flowchart showing the control program.

As seen from FIG. 5, the control program starts at a stage 50 when the control part of the steering system is powered on or reset, and goes to an initializing stage 51 for initializing peripheral devices to set necessary variables.

Then, the program flow enters a base loop comprising a plurality of stages 52 to 61, in which between and including stages 52 to 56 it is judged whether or not the transverse acceleration signal $y_1$ is kept out of excess of the reference level TL for a period of about two seconds.

At the first stage 52 of the base loop, a software counter N has a later-described integer i substituted therein.

Then, at a subsequent stage 53, the transverse acceleration detection signal y is read from the transverse acceleration sensor 34 through the integral circuit 35 to obtain the transverse acceleration signal $y_1$. At a decision stage 54 next thereto, it is judged whether or not the absolute value of the level difference between the transverse acceleration signal $y_1$ and the reference level TL is above zero. When this absolute difference is not above zero, the transverse acceleration signal $y_1$ is judged to be in excess of the reference level TL, which means the travelling condition of the vehicle is judged not to be substantially straight, and the program flow goes to the first stage 52 of the basic loop, where the integer i is again substituted in the software counter N.

In the case where the absolute difference between the signal $y_1$ and the level TL is above zero, which means the travelling condition of the vehicle is substantially straight, the software counter N has the count number thereof reduced by one.

At a subsequent decision stage 56, a judgment is made as to whether or not the count number of the counter N is zero. When this count number is unequal to zero, which implies that the substantially straight travelling condition of the vehicle is not continued for two seconds, then the program flow goes to the stage 53.

To the contrary, when the count number is zero, which implies that the substantially straight travelling condition has elapsed two seconds, the flow proceeds to a stage 57.

Incidentally, in the foregoing embodiment, there may be employed system clock working at a 20 kHz or thereabouts, letting the process time between and including the stages 53 to 56 be approximately 4 milliseconds. In such a case, the substituting integer i may be 500.

At the stage 57, the speed data signal u is read from the vehicle speed sensor 32 to determine a corresponding necessary steered angle ratio $k_1$, while, at a stage 58 next thereto, an actual steered angle ratio $k_2$ is read from the slider position sensor 33. Then, at a stage 59, the steered angle ratios $k_1$ and $k_2$ are compared for a judgment in a decision stage 60 as to whether or not an output to the control motor 29 is necessary.

When, at the decision stage 60, the output to the motor 29 is judged necessary, then the correction signal $b_1$ is output at the last stage 61 of the base loop to the motor 29, thereby moving the slider 27 to a proper position, to correct the actual steered angle ratio $k_2$ to $k_1$. On the other hand, when the output to the motor 29 is judged unnecessary at the stage 61 or when the stage 61 has its process completed, then the program flow goes to the stage 52.

Figure 6:
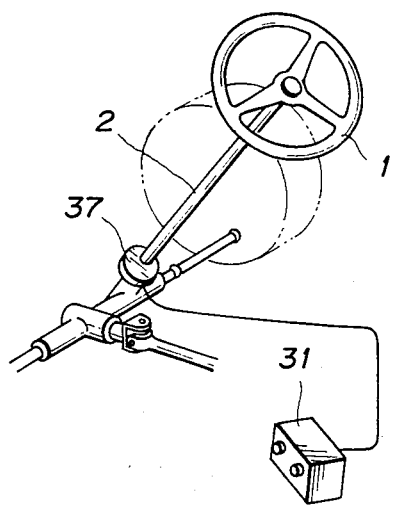
FIG. 6 is a perspective view of a control part of a steering system for vehicles according to a modified example of the preferred embodiment of the invention.

FIG. 6 shows a control part of a steering system according to a modified example of the preferred embodiment of the invention. For the convenience of comprehension, like parts are designated by like reference characters in relation to the preferred embodiment.

In the steering system according to the modified example, in place of the transverse acceleration sensor 34 of FIG. 2, a sensor 37 for detecting the steering angle of a front wheel (not shown) is provided on the lower part of a steering shaft 2. Instead of the transverse acceleration signal $y_1$, there is employed a front wheel steering angle signal $\alpha$ obtained from the front wheel steering angle sensor 37, to thereby judge whether or not the vehicle is in a substantially straight travelling condition, in a computer 31.

Figure 7:
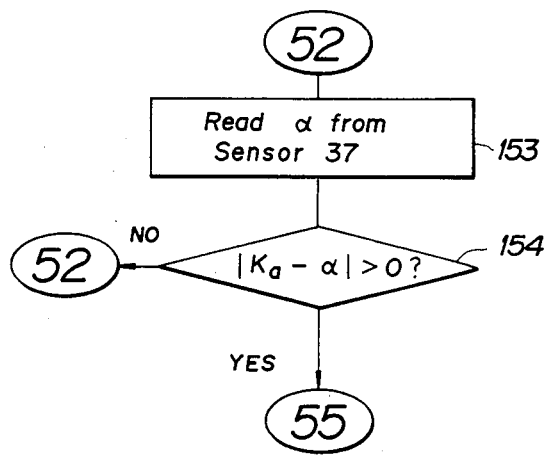
FIG. 7 is a schematic flowchart of a program for a microcomputer system of the control part of FIG. 6.

The above and further processes of the computer 31 are exercised by following a control program stored in a ROM as a memory of the computer 31. The flow of this control program is substantially similar to that of the preferred embodiment, subject to a difference described in detail below. In other words, in the modified example, there are employed a pair of stages 153, 154 shown in FIG. 7 in place of the stages 53, 54 of FIG. 5.

Namely, at the stage 153, the front wheel steering angle signal $\alpha$ is read from the sensor 37. Then, at the stage 154, it is judged whether or not the absolute value of the difference between a steering angle represented by the signal $\alpha$ and a predetermined reference steering angle Ka is above zero. When this angle difference is above zero, the program flow goes to a stage 55. In the case where the angle difference is not above zero, the flow goes to a stage 52.

As will be understood from the foregoing description, in a steering system according to the preferred embodiment of the invention, a correction of the steered angle ratio in accordance with the vehicle speed is effected only when a straight travelling condition of the vehicle is maintained for a predetermined period of time. As a result, the correction of the steered angle ratio is not effected while the vehicle is turning and, therefore, even when the vehicle speed is varied while the vehicle is turning, the driver is permitted to be free from unnecessary correcting operations of a steering wheel, thus favorably facilitating the steering operation of the vehicle as a whole.

Incidentally, as a detection means for use in the detection of a straight travelling condition of the vehicle, there may be employed, not only a transverse acceleration sensor or a front wheel steering angle sensor, but also a yaw angle sensor for detecting the yaw angle of the vehicle to provide a yaw angle signal to be processed in a computer or a roll angle sensor for detecting the roll angle of the vehicle to provide a roll angle signal to be similarly processed.

Moreover, in the preferred embodiment of the invention, there may be employed a delay circuit instead of the integral circuit 35.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

We claim:

1. A steering system for vehicles including a steering wheel, a front wheel, front steering means for steering said front wheel, a rear wheel, rear steering means for steering said rear wheel, ratio changing means for changing the steered angle ratio of said rear wheel to said front wheel, control means for controlling said ratio changing means, ratio detecting means for detecting the steered angle ratio, said ratio detecting means cooperating with said control means, speed detecting means for detecting the vehicle speed, and said speed detecting means cooperating with said control means, in which said rear wheel is steered at relatively low vehicle speeds in the opposite direction to said front wheel or substantially at an angle of zero degree and at relatively high vehicle speeds in the same direction as said front wheel, wherein means for detecting a straight travelling condition of the vehicle is operatively connected to said control means, so that a correction of the steered angle ratio in accordance with the vehicle speed is effected only when said straight travelling condition of the vehicle is maintained for a predetermined period of time.

2. A steering system according to claim 1, wherein said straight travelling condition detecting means comprises a transverse acceleration sensor for detecting the transverse acceleration of the vehicle, and said control means comprises a microcomputer system including circuit means for eliminating high-frequency components of a detection signal of said transverse acceleration sensor.

3. A steering system according to claim 2, wherein said circuit means comprises an integral circuit.

4. A steering system according to claim 2, wherein said circuit means comprises a delay circuit.

5. A steering system according to claim 1, wherein said control means comprises a microcomputer system, and said straight travelling condition detecting means comprises a steering angle sensor for detecting the steering angle of said front wheel.

6. A steering system according to claim 1, wherein said predetermined period of time is approximately two seconds.

* * * * *